March 16, 1926.
F. E. CLARKE
SHOCK ABSORBER
Filed Nov. 10, 1924
1,576,573
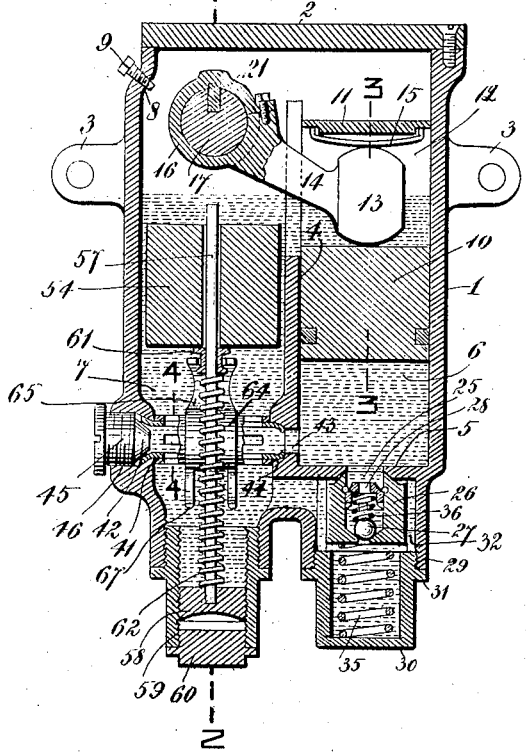
INVENTOR
Frederick E. Clarke
BY
ATTORNEYS Patented Mar. 16, 1926.

1,576,573

UNITED STATES PATENT OFFICE.

FREDERICK E. CLARKE, OF SOMERVILLE, MASSACHUSETTS, ASSIGNOR TO JAMES S. LANG, OF WATERTOWN, MASSACHUSETTS.

SHOCK ABSORBER.

Application filed November 10, 1924. Serial No. 748,852.

*To all whom it may concern:*

Be it known that I, FREDERICK E. CLARKE, of Somerville, in the county of Middlesex and State of Massachusetts, a citizen of the United States, have invented a new and useful Improvement in Shock Absorbers, of which the following is a full, clear, and exact description, reference being had to the accompanying drawings, forming a part of this specification in explaining its nature.

The present invention belongs to that class of shock absorbers which are especially adapted for motor vehicles and in which the force required to pass a fluid through a restricted opening is utilized to prevent excessive vibration or rebound. More particularly the invention relates to and improvement in that type of shock absorbers illustrated in Letters Patent of the United States granted to James S. Lang, No. 1,448,131, dated March 13, 1923 and No. 1,492,329, dated April 29, 1924, and other patents of James S. Lang pertaining to the same subject-matter.

The invention pertains essentially to an improvement in the valvular control for the restricted opening in the shock absorber through which the contained fluid is passed.

The object of the invention is to provide a valvular control in which the valve will be unaffected in its operation by frictional resistance incident to a lateral displacement of the shock absorber as by the vehicle to which it is attached rapidly changing its direction of movement as by passing along a curve in the roadway or passing around a corner; also, to provide a valvular control capable of an easy and economical application to the absorber casing and assemblage therein.

The invention can best be seen and understood by reference to the drawings in which—

Figure 1 is a vertical cross section of a shock absorber embodying the invention, such portion only of the absorber being shown as is necessary for a proper understanding of the invention.

Fig. 2 is a section on the line 2—2 of Fig. 1.

Fig. 3 is a section on the line 3—3 of Fig. 1.

Fig. 4 is a section on the line 4—4 of Fig. 1, and

Fig. 5 is the same as Fig. 4 excepting a slight detail to which special reference will hereinafter be made, and Fig. 6 is a cross section in enlarged detail of a portion of one of the valvular structures shown in Fig. 1.

Referring to the drawings:—

1 represents a casing having a removable cover 2. Projecting laterally from the casing are lugs or ears 3 by which it may be secured to the body or framework of the vehicle. On the inside the casing is provided with partitions 4 and 5, respectively, which form together with the walls of the casing a compression chamber 6 inside the casing and outside this chamber a secondary or expansion chamber 7, with openings between the two chambers.

The casing forms a receptacle for oil contained within its respective chambers admitted to the interior of the casing by way of an inlet 8 closed by a filling plug 9.

The compression chamber 6 is within a cylinder formed by the cooperation of the wall or partition 4 with the walls of the casing. Contained to reciprocate within the cylinder is a piston 10. Extending through the upper part of the piston is a rectangular opening 11 the surrounding top and side walls of which together with the body of the piston form a housing 12 within which is contained the outer end 13 of a rocker arm 14. The end of the rocker arm thus contained is provided with rounding top and bottom walls in order that it may accommodate itself to relative changes in position within the housing in which it is contained as the piston reciprocates within the cylinder. To eliminate lost motion and prevent vibration a spring 15 is inserted between the end of the rocker arm and the top wall of the housing and against which spring the end 13 of the rocker arm has bearing. The rocker arm at its inner end is provided with a hub 16 keyed to a rock shaft 17 inserted through an opening in the side of the casing which turns in spaced bearings 18 and 19, respectively, on the opposite side walls of the casing, the hub 16 occupying the space between the bearings. The hub 16 is a split hub the disconnected parts of which are combined and the hub tightened around the rock shaft by a bolt 20. The hub 16 is keyed to the rock shaft by means of a key 21, and in this connection it will be observed that the bearing 19 is of larger diameter than the bearing 18 permitting of the rock shaft with key in it being inserted through the opening in the side of the casing and the key afterward fitting within a slot 22 in the hub 16. The hub is afterward tightened around the rock shaft 17 by the bolt 20 when lateral displacement of either the hub or shaft is prevented by engagement of the hub with the respective bearings 18 and 19.

The rock shaft 17 is provided outside the casing with a head 23 and this head connects with the axle of the vehicle by a flexible mechanism (not shown, but substantially as illustrated in the patents above referred to).

With the casing secured to the body of the vehicle and the piston connected to its axle, any change in the relative positions of the axle and vehicle body will act to move move the piston 10, which is raised or lowered in the cylinder.

Owing to the manner of controlling the passage of oil between the compression chamber and the secondary chamber, the piston is controlled to move upwardly within the compression chamber with a relatively free movement, but provision is made for impeding its action when moved in a reverse direction. To this end, communication between the compression and secondary or expansion chambers comprises a port 25 in the partition 5 forming a valve seating, and this port is controlled by a valvular mechanism or device which permits of the contained fluid freely moving through the port from the secondary into the compression chamber on the ascent of the piston or under light pressure when the piston is moving in one direction, and permitting of the contained fluid passing out of the compression chamber through the port into the secondary chamber on the descent or reverse movement of the piston only under determinate conditions of high pressure, such conditions being when the pressure within the compression chamber becomes so intense that it might, unless relieved, cause breakage of some of the operating parts.

The valvular mechanism or device is constructed as follows: It comprises separate valves 26 and 27, respectively. The valve 26 is a hollow valve preferably tubular in form with an opening or passage 28 through it. The valve is located outside the compression chamber within the secondary chamber and between the wall or partition 5 and the bottom wall of the casing 1. The valve is inserted within the casing through an opening 29 in the bottom of the casing. This opening is closed after the valve 26 has been inserted, by a hollow threaded plug 30 having a flange 31 which engages the under side of the casing on tightening the plug. The valve 26 is movable between its closed and open positions on guides or ways 32 formed on the side walls of the casing. When movable inwardly to a closed position, the inner preferably beveled end 33 of the valve engages the wall or partition 5 around the port or opening 25 in it, the valve closing against a valve seat on said partition. When the valve 26 is closed communication between the compression and secondary chambers is cut off at the forward end of the valve, but communication is had between said chambers around the rear end of the valve by way of the passage 28 through the valve which is in open communication with the port 25. When the valve 26 is open then direct communication is had between the primary and secondary chambers by way of the port 25 and the opening left between the forward end of the valve and its valve seat. When fully opened the valve 26 engages the inner end of the plug 30 acting as a stop. The valve 26 is provided on its interior adjacent its outer end with a valve seat 34, the passage 28 being extended by this seat and through the end of the valve and which passage is controlled by the valve 27 to which reference will presently be made. The valve 26 is maintained in a normally closed position by a tension spring 35 contained within the hollow plug 30 and bearing at one end against the bottom of the plug and at its other end against the under side of the valve.

The valve 27 controlling the passage 28 through the valve 26 is preferably a ball valve and opens in a direction reverse to the direction of opening of the valve 26, the valve 27, in other words, being an inwardly-opening valve with relation to the port or opening 25. In the present application of the valvular mechanism and in other ordinary uses thereof the valve 27 will assume by gravity a normally closed position. In order to secure, however, its quick and positive closure I prefer that it be subjected to the tension of a spring 36 having bearing against the valve at one end and at its opposite end against a spring holder 37 located within the hollow of the valve 26 and having an opening through it which forms part of the passage 28 through the valve 26 as above referred to. The spring holder 37 is held in place by means of a ring 38 which fits within an annular groove cut on the interior of the valve 26, this ring being sprung into place after the spring 36 and holder 37 have been inserted inside the valve 26. The spring 36 is in practice a spring having a very light tension as compared with the spring 35 which holds the valve 26 in a normally closed position.

The operation of the valvular mechanism is as follows: Assuming the valve 26 to be closed, an excess of pressure in the secondary chamber over that of the compression chamber due to the rise of the piston will exert a lifting pressure upon the valve 27 opening this valve and compressing the light spring 36, thereby permitting fluid from the secondary chamber to enter the compression chamber by way of the passage 28. To insure a free passage of fluid in case the valve 27 is lifted so far as to engage the spring holder 37, the holder is provided with a series of channels 39 cut in the under side thereof.

On the other hand, a heavy excess of pressure in the compression chamber over that in the secondary chamber due to the descent of the piston will find both valves 26 and 27 closed completely, shutting off communication between the two chambers. When the pressure becomes so intense as to overcome the tension of the spring 35 holding the valve 26 in a closed position, thereupon the valve 26 will be opened and the pressure allowed to escape to the secondary chamber by way of the port 25 and around the inner end of the valve 26. Immediately upon such pressure being relieved the valve 26 will assume its normally closed position.

There is also provided an outlet from the compression chamber into the secondary chamber. This outlet comprises one or more openings 40 formed within a hollow tubular fitting 41 which is inserted inside the casing through an opening 42 in the side thereof in line with the compression chamber at about the bottom of this chamber.

Entrance is had into the interior of the fitting 41 from the compression chamber by way of an opening 43 through the partition 4 and thence through the open inner end of the fitting. The inner end of the fitting is retained and a slight connection established between its open end and the opening 43 by the inner end of the fitting, preferably contracted, fitting tightly within a socket 44 formed within a boss or thickening on the side of the partition 4. The outer end of the fitting 41 is retained and the opening through it closed from the opening 42 in the side of the casing by means of a plug 45 threaded to fit within the opening 42 and extending into the outer end of the fitting 41. In making this connection it is preferred that the outer end of the fitting 41 be slightly expanded and the inner end 46 of the plug be beveled to fit snugly therein. The thrust of the plug 45, as the plug is tightened, operates not only to hold the fitting 41 securely in place, but also to establish tight connections at both ends of the fitting.

Mounted upon the fitting 41 is a rotary valve 50 having openings 51 in it which register with the openings 40 in the fitting 41 when the valve is open, the valve being closed when the openings 40 and 51 in the fitting and valve respectively are out of register.

The openings 40 and 51 in the fitting and valve, respectively, may be straight radial openings as shown in Fig. 5. In such case when an outward flow of fluid takes place through the fitting and valve with the valve open, the fluid being under pressure as when compressed by the piston in the compression chamber, the pressure of the fluid will have no appreciable influence on the valve to change its position. It is preferred, however, that the openings 40 and 51 in the fitting and valve, respectively, be not radial openings, but bear an angular relation to one another as shown in Fig. 4. When so arranged the fluid under pressure passing through the openings 40 in the fitting will impinge upon the edge or wall 52 of the openings 50 in the valve and will operate to effect a partial closure of the valve or in any event make the valve very sensitive to closure.

Arranged as it is upon the fitting fixed to the casing, the valve is movable with the casing, as for example when the casing is displaced in a vertical direction. The valve has a permitted rotary movement and is held against endwise displacement by the side walls of the casing between which the valve is interposed.

Located within the secondary chamber of the casing and preferably arranged above the valve with freedom of movement within the casing in a vertical direction is a weight 54. An opening 55 in the side of the casing closed by a panel 56 permits of this weight being placed within the casing. 57 is a vertical guide for the weight and preferably takes the form of a post passing upwardly through the centre of the weight, the weight loosely embracing the guide. The guide is mounted and extends upwardly from an adjustable support 58 to which it is preferably fixed. This support is threaded within a plug 59 which has threaded connection with the under side of the casing around an opening therein. The outer end of the plug 59 on the adjustable guide support 58 is closed by an auxiliary plug 60.

Loosely arranged upon the guide immediately beneath the weight and preferably fixed thereto is a thimble 61. Arranged also upon the guide, interposed between the guide support 58 and the thimble, is a tension spring 62 which acts to support the weight. The spring 62 is a relatively light spring but of sufficient tension to maintain the weight in a position of substantial balance and also in a determinate position with relation to the valve through adjustment of the guide support 58 by which the spring is supported and against which it has bearing.

Connected to the valve by a hub 64 is a curved arm 65 the outer end 66 of which is made in the form of a claw which straddles the thimble and extends beyond it. The arrangement of the parts is such that the arm 65, when the weight is supported in a determinate position with relation to the valve and in a condition of substantial balance, will hold the valve as shown in either Fig. 4 or Fig. 5. In such case, if the weight be displaced compressing the spring 62 or on the other hand, if the casing and valve with it be moved upwardly with relation to the weight, assuming the weight to maintain its position, then in either event, by reason of the relative change in position of the weight and valve, the weight will operate to close the valve. To prevent the weight from turning the valve beyond a desired limit of motion, the valve is provided on the under side with stops 67 which engage the side of the casing after the valve has been turned to its full closed position.

The general operation is as follows: Assuming the weight 54, unaffected by other forces, to be supported in a state of substantial balance and supported also in such determinate position as to maintain the valve 50 in a full open position as indicated in Figs. 1 and 4 through the connecting arms 65: Assuming now that a flow of fluid takes place from the compression chamber 6 through the outlet and openings in the valve, this being brought about by a difference of pressures in the chambers 6 and 7, resulting from a movement of the piston, at such time the valve will be unaffected by the flow of fluid through it, excepting that when the openings 40 in the fitting 41 and openings 51 in the valve bear an angular relation to one another substantially as shown in Fig. 4, then the pressure of fluid will operate to effect a partial closure of the valve, the spring 62 being then slightly compressed and permitting of such closure.

If for any reason the weight be depressed it will operate through the connecting arm 65 to close the valve. Likewise if the absorber casing and valve 50 with it be suddenly raised in a vertical direction the inertia of the weight due to its considerable mass and free suspension, will tend to cause it to lag behind the rise of the casing and valve compressing the spring 62 and resulting in a relative movement between the weight and valve and thereupon the valve, governed as it is in its opening and closure by such change in the relative position between it and the valve, will operate to close the valve through the connecting arm 65. Such closure continues until the stops 67 on the valve engage the side of the casing which defines the full closed position of the valve. If the upward movement of the casing is not continued the compressed spring 62 will in turn overcome the inertia of the weight and will return it to its original determinate position reopening the valve through the connecting arm 65.

These operations attend various movements of the vehicle body in connection with which the absorber is used and result in the prevention of excessive vibration or rebound thereof as pointed out in detail in the patents of James S. Lang previously referred to.

Having thus fully described my invention, I claim and desire to secure by Letters Patent of the United States:—

1. A fluid check shock absorber for controlling the movement of relatively movable parts comprising a casing attachable to one of said parts and having a pressure chamber in it, said casing being provided also with means permitting of the circulation of a contained fluid into and out of said chamber and consisting in part of a controllable outlet, a piston attachable to the other of said parts and reciprocable in said pressure chamber, a valve for controlling said outlet, a weight arranged to have freedom of movement within the casing relatively to the valve, an elastic support for the weight, and means whereby the valve will be operated upon relative change in position between the weight and valve.

2. A fluid check shock absorber for controlling the movement of relatively movable parts comprising a casing attachable to one of said parts and having a pressure chamber in it, said casing being provided also with means permitting of the circulation of a contained fluid into and out of said chamber and consisting in part of a controllable outlet, a piston attachable to the other of said parts and reciprocable in said pressure chamber, a valve controlling said outlet, a weight having freedom of movement in the casing relatively to the valve, means for elastically supporting the weight to occupy normally a determinate position relatively to the valve, and means whereby the weight will operate the valve to control said opening upon a relative change in the position of the weight and valve.

3. A fluid check shock absorber for controlling the movement of relatively movable parts comprising a casing attachable to one of said parts and having a pressure chamber in it, said casing being provided also with means permitting of the circulation of a contained fluid into and out of said chamber and consisting in part of a controllable outlet, a piston attachable to the other of said parts and reciprocable in said pressure chamber, a valve controlling said outlet, a weight independent of the valve arranged to have freedom of movement within the casing relatively to the valve, means for guiding the weight, means for elastically supporting the weight to occupy normally a determinate position relatively to the valve, and means whereby the weight will operate to actuate the valve for controlling said outlet upon a change in the relative positions of the weight and valve.

4. A fluid check shock absorber for controlling the movement of relatively movable parts comprising a casing attachable to one of said parts and having a pressure chamber in it, said casing being provided also with means permitting of the circulation of a contained fluid into and out of said chamber and consisting in part of a controllable outlet, a piston attachable to the other of said parts and reciprocable in said pressure chamber, a valve controlling said outlet, a weight independent of the valve and having freedom of movement relatively to the valve within the casing, a guide for the weight, an elastic support for the weight for maintaining it in a normal determinate position relatively to the valve, and a connecting means between the weight and valve for maintaining the valve in an open position when the weight is in its determinate position as aforesaid and functioning to operate the valve for controlling said outlet upon change in the relative positions between the weight and valve.

5. A fluid check shock absorber for controlling the movement of relatively movable parts comprising a casing attachable to one of said parts and having a pressure chamber in it, said casing being provided also with means permitting of the circulation of a contained fluid into and out of said chamber and consisting in part of a controllable outlet, a piston attachable to the other of said parts and reciprocable in said pressure chamber, a valve controlling said outlet arranged within the casing in a manner whereby the valve will move with the casing when the casing is subjected to a force tending to displace it in a vertical direction, a weight contained within the casing, means for elastically supporting the weight whereby when the casing and valve are subjected to a force tending to displace them in a vertical direction the valve will move relatively to the weight due to the inertia of the weight, and means whereby the valve will be operated by the weight to control said outlet as the valve moves relatively to the weight as aforesaid.

6. A fluid check shock absorber for controlling the movement of relatively movable parts comprising a casing attachable to one of said parts and having a pressure chamber in it, said casing being provided also with means permitting of the circulation of a contained fluid into and out of said chamber and consisting in part of a controllable outlet, a piston attachable to the other of said parts and reciprocable in said pressure chamber, a valve controlling said outlet arranged within the casing in a manner whereby the valve will move with the casing when the casing is subjected to a force tending to displace it in a vertical direction, a weight loosely arranged within the casing whereby the valve will be moved relatively to the weight when the casing and valve are subjected to a force tending to displace them in a vertical direction, a guide for the weight, means for elastically supporting the weight, and means whereby the valve will be operated by the weight to control said outlet as the valve moves relatively to the weight as aforesaid.

7. A fluid check shock absorber for controlling the movement of relatively movable parts comprising a casing attachable to one of said parts and having a pressure chamber in it, said casing being provided also with means permitting of the circulation of a contained fluid into and out of said chamber and consisting in part of a controllable outlet, a piston attachable to the other of said parts and reciprocable in said pressure chamber, a valve controlling said outlet arranged within the casing in a manner whereby the valve will move with the casing when the casing is subjected to a force tending to displace it in a vertical direction, a weight loosely arranged within the casing whereby the valve will be moved relatively to the weight when the casing and valve are subjected to a force tending to displace them in a vertical direction, a guide for the weight, means for elastically supporting the weight in a normally determinate position with relation to the valve, and means whereby the weight will operate to close the valve when the valve is moved relatively to the weight upon displacement of the valve as aforesaid and afterward assist in reopening the valve upon the return of the weight to its said normal determinate position.

8. A fluid check shock absorber for controlling the movement of relatively movable parts comprising a casing attachable to one of said parts and having a pressure chamber in it, said casing being provided also with means permitting of the circulation of a contained fluid into and out of said chamber and consisting in part of a controllable outlet, a piston attachable to the other of said parts and reciprocable in said pressure chamber, a rotary valve controlling said outlet, means for mounting the valve to be movable with the casing when the casing is subjected to force tending to move it in a vertical direction, a weight loosely arranged within the casing, means for supporting the weight comprising in part an elastic support for maintaining the weight in a normally determinate position with relation to the valve, and means whereby the valve will be operated for controlling said outlet upon a relative change in the position of the weight and valve.

9. A fluid check shock absorber for controlling the movement of relatively movable parts comprising a casing attachable to one of said parts and having a pressure chamber in it, said casing being provided also with means permitting of the circulation of a contained fluid into and out of said chamber and consisting in part of a fixture connecting with the pressure chamber and having an opening in it providing an outlet from said chamber, a piston attachable to the other of said parts and reciprocable in said pressure chamber, a rotary valve mounted upon said fixture for controlling the outlet, a weight loosely arranged within the casing, means for elastically supporting the weight in a normal determinate position with relation to the valve and in a manner whereby owing to the inertia of the weight the valve will be moved relatively to the weight when the casing and valve are subjected to a force tending to displace them in a vertical direction, and means whereby the weight will operate to close the valve when the valve is moved relatively to the weight upon displacement of the valve as aforesaid and afterward assist in reopening the valve upon the return of the valve to its normal determinate position.

10. A fluid check shock absorber for controlling the movement of relatively movable parts comprising a casing attachable to one of said parts and having a pressure chamber in it, said casing being provided also with means permitting of the circulation of a contained fluid into and out of said chamber and consisting in part of a fixture connecting with the pressure chamber and having an opening in it providing an outlet from said chamber, a piston attachable to the other of said parts and reciprocable in said pressure chamber, a rotary valve mounted upon said fixture and having an opening in it coincident with the opening in said fixture when the valve is open, said openings in the fixture and valve, respectively, being angularly arranged with relation to one another whereby the fluid under pressure when compressed by the piston passing through said openings will tend to effect a partial closure of the valve, a weight loosely arranged within the casing, means for elastically supporting the weight in a normal determinate position with relation to the valve and in a manner whereby owing to the inertia of the weight the valve will be moved relatively to the weight when the casing and valve are subjected to a force tending to displace them in a vertical direction, and means whereby the weight will operate to close the valve when the valve is moved relatively to the weight upon displacement of the valve as aforesaid and afterward assist in reopening the valve upon the return of the valve to its normal determinate position.

11. A fluid check shock absorber for controlling the movement of relatively movable parts comprising a casing attachable to one of said parts and having a pressure chamber in it, said casing being provided also with means permitting of the circulation of a contained fluid into and out of said chamber and consisting in part of a fixture connecting with the pressure chamber and having an opening in it providing an outlet from said chamber, a piston attachable to the other of said parts and reciprocable in said pressure chamber, a rotary valve mounted upon said fixture and having an opening in it coincident with the opening in said fixture when the valve is open, said openings in the fixture and valve, respectively, being angularly arranged with relation to one another whereby the fluid under pressure when compressed by the piston passing through said openings will tend to effect a partial closure of the valve, a weight arranged to have freedom of movement within the casing relatively to the valve, means for elastically supporting the weight, and means whereby the valve will be operated upon relative change in position between the weight and valve.

12. A fluid check shock absorber for controlling the movement of relatively movable parts comprising a casing attachable to one of said parts and having a pressure chamber in it, said casing being provided also with means permitting of the circulation of a contained fluid into and out of said chamber and consisting in part of a fixture connecting with the pressure chamber and having an opening in it providing an outlet from said chamber, said fixture being inserted inside the casing through an opening in the side thereof, a plug retaining said fixture closing the outer end thereof and said opening in the side of the casing, a piston attachable to the other of said parts and reciprocable in said pressure chamber, a rotary valve mounted upon said fixture controlling said outlet, a weight arranged to have freedom of movement within the casing relatively to the valve, means for elastically supporting the weight, and means whereby the valve will be operated upon relative change in position between the weight and valve.

13. A fluid check shock absorber for controlling the movement of relatively movable parts comprising a casing attachable to one of said parts and having a pressure chamber in it, said casing being provided also with means permitting of the circulation of a contained fluid into and out of said chamber and consisting in part of a controllable outlet, a piston attachable to the other of said parts and reciprocable in said pressure chamber, a valve for controlling said outlet, a weight arranged to have freedom of movement within the casing relatively to the valve, a guide for said weight, an adjustable support for said guide, a spring arranged upon the guide interposed between the guide support and the weight for elastically supporting the weight, and means whereby the valve will be operated upon relative change in position between the weight and valve.

14. A fluid check shock absorber for controlling the movement of relatively movable parts comprising a casing attachable to one of said parts and having a pressure chamber in it, said casing being provided also with means permitting of the circulation of a contained fluid into and out of said chamber and consisting in part of a fixture connecting with the pressure chamber and having an opening in it providing an outlet from said chamber, a piston attachable to the other of said parts and reciprocable in said pressure chamber, a rotary valve mounted upon said fixture for controlling said outlet, a weight arranged to have freedom of movement within the casing relatively to the valve, means for elastically supporting said weight in a determinate position with relation to said valve, an arm connected to said valve, means for loosely connecting the arm to said weight whereby the weight may maintain the valve in an open position when said weight is occupying its determinate position as aforesaid and said weight close said valve upon a relative change in position of said weight and valve, and means for limiting the closing movement of said valve.

15. A fluid check shock absorber for controlling the movement of relatively movable parts comprising a casing attachable to one of said parts and having a pressure chamber in it, said casing being provided also with means permitting of the circulation of a contained fluid into and out of said chamber and consisting in part of a fixture connecting with the pressure chamber and having an opening in it providing an outlet from said chamber, a piston attachable to the other of said parts and reciprocable in said pressure chamber, a rotary valve mounted upon said fixture for controlling said outlet, a weight arranged to have freedom of movement within said casing, a guide for the weight, an adjustable support for the guide, a thimble loosely arranged upon the guide beneath said weight, a spring interposed between said guide support and weight with bearing against said thimble, and a curved arm connected to said valve and having a forked end embracing said thimble.

16. In a fluid check shock absorber, a casing, a piston reciprocable inside said casing, said piston being provided with a housing, a rock shaft journaled to turn on said casing, a rocker arm connected to said shaft to extend therefrom with the outer free end of the arm located within said housing, and a spring contained within said housing against which said outer end of the rocker arm has bearing.

17. In a fluid check shock absorber, a casing having spaced bearings formed thereon and a rock shaft journaled to turn in said bearings, said shaft extending through an opening in the side of the casing adjacent one of said bearings and which opening and said one of the bearings are of larger internal diameter than the other of said bearings, a rocker arm having a split hub fitting around said shaft located between said bearings, means for tightening said hub onto said shaft, and a key between said hub and shaft, the arrangement being such that the rock shaft with key in it may be inserted inside said casing through the opening in the side thereof and bearing adjacent thereto in the assemblage of the parts prior to the tightening of the hub of the rocker arm onto said shaft.

FREDERICK E. CLARKE.